Patented July 5, 1927.

1,634,986

UNITED STATES PATENT OFFICE.

EDWARD S. FARROW, JR., OF ROCHESTER, NEW YORK, ASSIGNOR TO EASTMAN KODAK COMPANY, OF ROCHESTER, NEW YORK, A CORPORATION OF NEW YORK.

PROCESS OF TREATING CELLULOSE ACETATE.

No Drawing. Application filed October 12, 1925. Serial No. 62,214.

This invention relates to processes of treating cellulose acetate in such a way as to change its solubility toward different organic solvents. One object of the invention is to provide a process in which chloroform-soluble cellulose acetate is quickly, reliably and inexpensively hydrolyzed to the desired degree, say to acetone solubility. A further object of the invention is to provide a process for obtaining acetone-soluble cellulose acetate from chloroform-soluble cellulose acetate without depriving it of any of the qualities which it should have when made into products like film. Another object of the invention is to provide an ingredient for use in the hydrolyzing step which will not be volatilized, if the cellulose acetate is spray dried, but will be readily removable from the cellulose acetate after spray drying. Other objects will hereinafter appear.

In the usual process of making cellulose acetate acetylating agents act on cellulose in the presence of catalysts. The reaction mixture often comprises, for example, cellulose, acetic anhydride, acetic acid and a catalyst, such as sulfuric acid. As the reaction proceeds and the cellulose becomes acetylated, the product dissolves in the acetic acid so as to form a thick reaction mass or dope. An example of this general type of reaction mixture is given in detail in U. S. Reissue Patent No. 12,637, Miles, April 23, 1907. Of course, in place of sulfuric acid another liquid or solid condensing agent, well known in the art, may be employed.

The acetylating reaction at first forms cellulose acetate which is soluble in chloroform. It is highly desirable to convert this cellulose acetate into the acetone-soluble form. I have found that this can be done simply, rapidly and relatively inexpensively by acting upon the chloroform-soluble cellulose acetate, while it is in solution in acetic acid, say the acetic acid of the reaction mass, with phosphoric acid and water.

After the treatment has proceeded to the proper degree, the cellulose acetate thus acted on, can be separated from the acetic acid, phosphoric acid and other ingredients of the reaction mass. While plain precipitation in water and washing may be employed, I prefer to spray-dry the reaction mass and recover the acetic acid from the vapors which are evolved during this operation. The cellulose acetate powder can then be washed to remove the phosphoric acid and any catalyzer. It is, therefore, a feature of my process that the acid, which is chiefly depended upon to bring about the hydrolysis of the cellulose acetate, is practically non-volatile and is especially suitable in the spray-drying process, because it does not contaminate the volatilized acetic acid, but remains in the powder where it can be easily removed.

The proportion of phosphoric acid employed relative to the weight of cellulose acetate to be treated, is small but can be varied over a considerable range provided the cellulose acetate, during the treatment is in solution in acetic acid and not precipitated out. Similarly, I prefer to use a relatively small proportion of water, but this can vary materially, so long as the cellulose acetate is not precipitated out, either locally or generally from the reaction mass.

I shall now give the preferred embodiment of my invention, by way of example, but it will be understood that the invention is not restricted to the details thereof, except as indicated in the appended claims. A cellulose acetate reaction mixture is prepared in accordance with the Miles patent hereinabove cited. This contains chloroform-soluble cellulose acetate dissolved in acetic acid. Of course, the catalyzer is still present. But if any acetic anhydride remains, it may be converted into acetic acid, or "killed" by acting upon it with the right amount of water. In order to avoid local precipitation, the right amount of water to convert the anhydride may be mixed with acetic acid and then stirred into the mass. Thereafter the hydrolyzing ingredients are stirred into the prepared reaction mass, as hereinafter described. It is to be noted, however, that instead of first killing the excess of anhydride, I may include enough water in my hydrolyzing mixture to first neutralize the acetic anhydride and then have enough left over to act in the hydrolysis step.

About 2200 parts of the above described prepared reaction mass or dope is then very thoroughly mixed with 5 parts of syrupy phosphoric acid and 540 parts of 75% acetic acid. In other words, 25% of the latter is water. The water and the phosphoric acid are the main agents in effecting the conversion from the chloroform-soluble form to the acetone-soluble form; and they work with superior speed and uniformity, because the ingredients are all in solution in acetic acid. The mixing of the water and the phosphoric acid with acetic acid, prior to mixing in the reaction dope, is highly desirable, because it enables the ingredients to be very thoroughly mixed without causing any local precipitation in different parts of the reaction mass. A rapid and homogeneous mingling of the ingredients takes place.

The reaction mixture is then maintained at a slightly elevated temperature, say about 54 or 55° C. until the hydrolysis is completed. This is determined by taking samples from the mass at intervals and testing the solubility characteristics of the cellulose acetate in the samples, after the usual precipitation, washing and drying. Under the conditions just described, the conversion of the cellulose acetate reaches the proper degree in 24 to 96 hours.

As soon as the hydrolysis is completed, the reaction mass or dope is spray dried in the manner indicated, for example, in U. S. Patent No. 1,516,225, Webb, November 18, 1924. During this action the phosphoric acid remains in the powder. The latter is then thoroughly washed, leaving the cellulose acetate in a very finely subdivided and highly purified form. Any of the related phosphoric acids, or mixtures of them, may be employed. I prefer, however, to use a syrupy form of ortho phosphoric acid containing from 15 to 30% of water, this being readily available commercially.

Having thus described my invention, what I claim as new and desire to secure by Letters Patent is:

1. In the process of making acetone-soluble cellulose acetate the step of treating chloroform-soluble cellulose acetate, while in solution in acetic acid with a mixture of phosphoric acid and water.

2. In the process of making acetone-soluble cellulose acetate the step of mixing into a reaction mass, which includes acetic acid and chloroform-soluble cellulose acetate, a mixture of acetic acid, water, and phosphoric acid.

3. In the process of making acetone-soluble cellulose acetate the steps of treating chloroform-soluble cellulose acetate, while in solution in acetic acid with phosphoric acid and water to induce acetone-solubility in said cellulose acetate, volatilizing acetic acid away from said cellulose acetate and dissolving away phosphoric acid from said cellulose acetate.

Signed at Rochester, New York, this 1st day of October 1925.

EDWARD S. FARROW, Jr.